J. S. & W. BENSON.
Wheel-Cultivator.
No. 68,549. Patented Sept. 3, 1867.
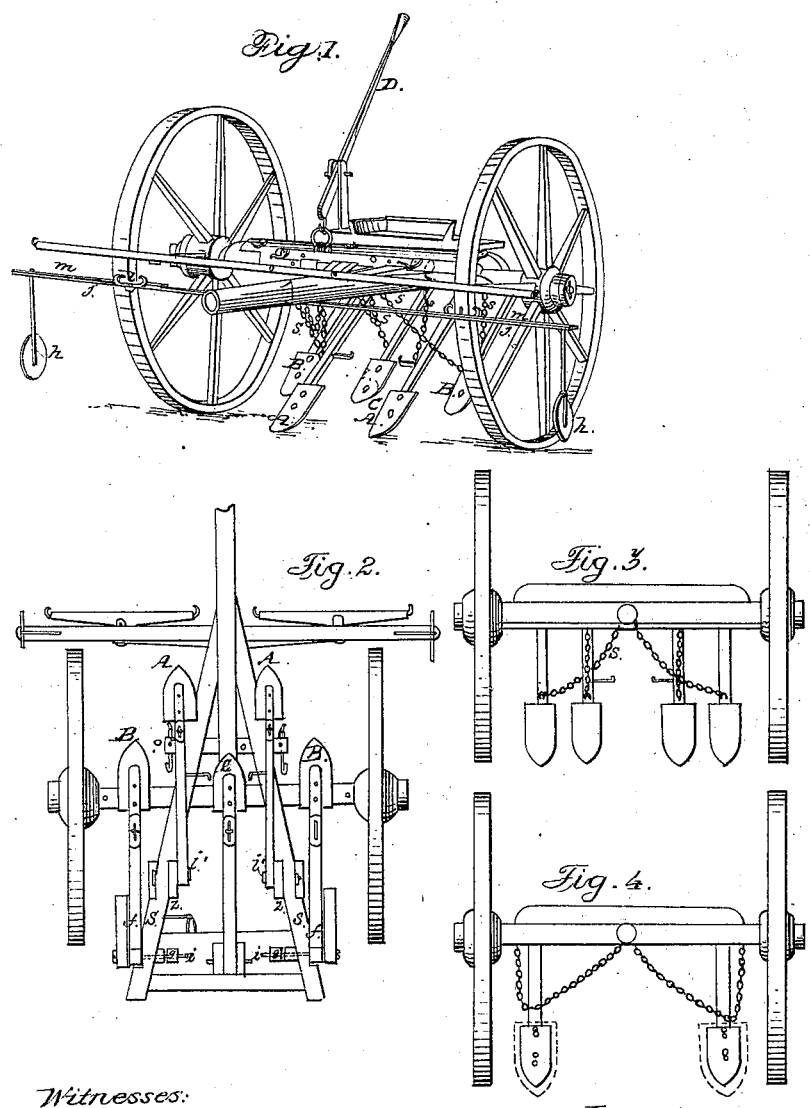

United States Patent Office.

JOSEPH BENSON, SAMUEL BENSON, AND WILLIAM BENSON, OF LEBANON, PENNSYLVANIA.

Letters Patent No. 68,549, dated September 3, 1867.

IMPROVEMENT IN CULTIVATORS.

The Schedule referred to in these Letters Patent and making part of the same.

TO ALL WHOM IT MAY CONCERN:

Be it known that we, JOSEPH BENSON, WILLIAM BENSON, and SAMUEL BENSON, of Lebanon, Lebanon county, State of Pennsylvania, have invented new and useful Improvements in Sulky-Cultivators, the same being adapted also to be used as a shovel-harrow, and especially as a machine for marking off land into rows and squares for planting; and we do hereby declare the following to be a full and exact description of the same, reference being had to the drawings that accompany and form a part of these specifications, in which—

Figure 1 is a view in perspective, prepared for use as shovel harrow.

Figure 2, plan view looking upon the bottom of the machine.

Figure 3, sectional elevation with central shovel removed.

Figure 4, view with three shovels removed.

Letters A A, two front teeth or shovels; letters B B, the two rear and outside shovels; letter C, the central shovel; letter D, lever by which the shovels are raised; letter $e$, chains connecting with lever D; letters $g\ g$, small blocks on the bolts $i\ i$; these interchange places with the supporting bar $f$ of the two outer shovels; letters $h\ h$, two small wheels suspended from the two ends of the bar J; these are made adjustable, and serve as guides when the machine is used as a corn-marker; letters $l\ l$, thumb-screws, which, in connection with the slides $m\ m$, afford the means of adjusting the guides $h\ h$; letter $f$, cross-bar, arranged just in front of the wheels, for supporting the guides $h\ h$; letter $o$, short cross-bar, to which the supporting chains of the two front shovels are attached.

The object of my invention is to provide a machine simple in structure, and one that may be adapted to various kinds of work, and without multiplying parts.

In fig. 1 the machine is fitted for the ordinary working of the soil, and for harrowing-in grain sown broadcast. When used as a cultivator of crops growing in rows, the central shovel is removed, as appears in fig. 3, and of the four remaining shovels, two pass each side of a row of whatever is being cultivated, the axle being carried sufficiently high to pass over corn when two or three feet in height. Should this machine be desired for marking off land for planting, that is, to indicate the rows and crossings, the three central shovels are removed, the two outer ones only being used, as in fig. 4. A set of larger shovels, as indicated by the red lines, may be used in the place of these two when a deeper and wider furrow is required. To graduate the distance between the rows the blocks $g\ g$ are brought into requisition. Of these there are two on each of the bolts $i$, and they may exchange places with the shovel-bar $f$, or one or both of them may be placed upon the outside of the support $s$, as represented by the section in red immediately below fig. 2. The guides $h\ h$ should be so arranged that the distance from each to the shovel nearest it will be just the distance desired between the rows, so that in each successive time of passing to and fro across the field one of these guide-wheels, $h\ h$, may be kept directly above a furrow already made, and thus secure a uniformity in space between the rows throughout the field.

What we claim as of our invention, and desire to secure by Letters Patent, is—

1. The use of the blocks $g\ g$, more or less in number, and the blocks $z\ z$, more or less in number, arranged upon the rods $i$, and so combined with the standards $f$ as to allow the arrangement of either standards or blocks on either side of the bars $s\ s$ when desired, and for the purposes specified.

2. We claim the guides $h\ h$ when arranged, combined, and used substantially in the manner described, and for the purposes set forth.

JOSEPH BENSON,
SAMUEL BENSON,
WILLIAM BENSON.

Witnesses:
ANTHONY S. ELY,
DAVID ZUG.